March 20, 1962     G. R. FRICK     3,025,916
APPARATUS FOR INSERTING TOOLS INTO SUBMARINE OPEN BORE HOLES
Filed Oct. 14, 1957     2 Sheets-Sheet 1
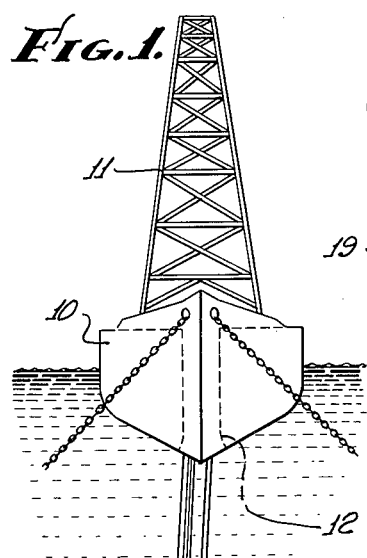
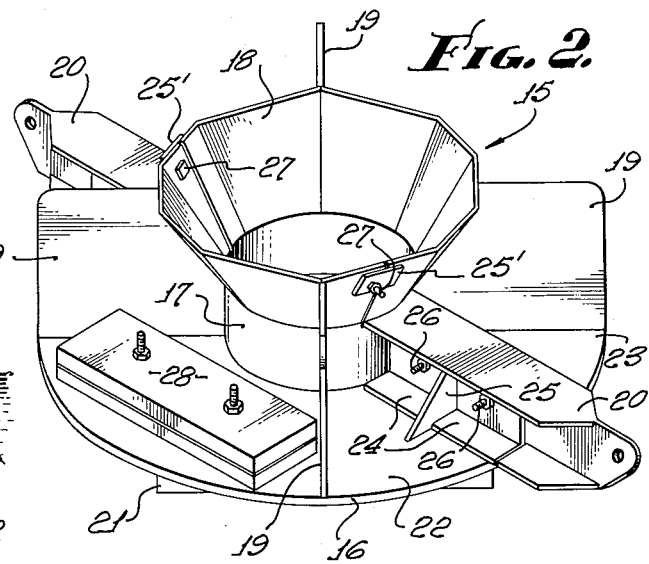
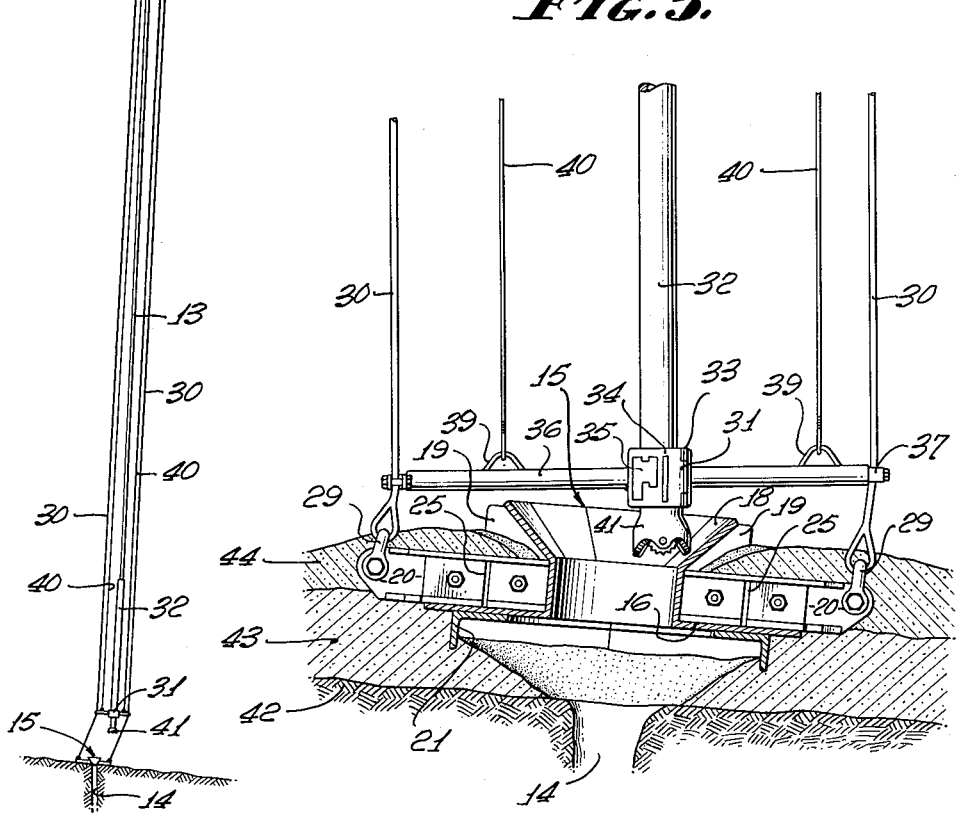

March 20, 1962 G. R. FRICK 3,025,916
APPARATUS FOR INSERTING TOOLS INTO SUBMARINE OPEN BORE HOLES
Filed Oct. 14, 1957 2 Sheets-Sheet 2

INVENTOR.
GILBERT R. FRICK
BY
AGENT.

United States Patent Office 3,025,916
Patented Mar. 20, 1962

3,025,916
APPARATUS FOR INSERTING TOOLS INTO SUBMARINE OPEN BORE HOLES
Gilbert R. Frick, Huntington Park, Calif., assignor, by mesne assignments, to Socony Mobil Oil Company, Inc., New York, N.Y., a corporation of New York
Filed Oct. 14, 1957, Ser. No. 690,085
3 Claims. (Cl. 175—7)

This invention relates to submarine drilling and more particularly to the operations of inserting drilling tools and other instruments and equipment into an open hole at the bottom of a body of water.

The customary practice of drilling from platforms or towers erected on the bottom is very costly when the water is fifty feet or more in depth and the expense is usually considered prohibitive when the water is as deep as a hundred feet. But the alternative method of drilling from a floating ship or barge has been difficult, especially in marine locations, because the action of currents, winds, and waves makes it impossible to maintain the drilling equipment at the surface in a fixed position.

Some of the problems in drilling from a floating vessel have been circumvented heretofore. By a system of anchors it is possible to maintain a vessel approximately, although not exactly, over the drilling site. If the rotary table is mounted on gimbals, it can function in spite of changes in the inclination of the deck of a vessel. The use of telescoping splined connections in the drilling shaft permits the drill bit to remain on the bottom of the hole with a constant weight regardless of the rising and falling of the vessel. The inherent flexibility of drill pipe allows the shaft to bend as the vessel changes its position in the horizontal plane.

The use of a conductor pipe between the vessel and the bottom of the body of water introduces problems which, though not insuperable, are the causes of frequent delays and other added expenses in a drilling operation; consequently, it is preferable to do as much of the drilling as possible without one. This is feasible because plain water or sea water is often an adequate drilling fluid and, as it need not be recovered for continued use, it can be discharged from the mouth of an open hole at the bottom of a body of water. When the drilling is for the purpose of taking core samples for exploration or research, an open hole is frequently all that is ever needed, and when the intention is to drill a producing well, much of the work can usually be done before there is need of setting a casing or conductor pipe.

However, it is necessary to withdraw the tools from the hole from time to time, and after this has been done the reinsertion of the tools into the open hole has been a difficult and time-consuming task by any of the methods heretofore proposed for use in deep and unquiet water.

It is an object of this invention to provide an apparatus for inserting drilling tools and other instruments and equipment into an open hole at the bottom of a body of water.

Another object of my invention is to permit drilling at the bottom of bodies of water of great depth.

Further objects and advantages of my invention will be apparent from the following description and from the drawing, in which:

FIG. 1 is a diagrammatic representation of the operation of lowering a string of drilling tools into an open submarine borehole;

FIG. 2 is a perspective view of the guide weight employed in the operation;

FIG. 3 is a view, partially in section, showing the mouth of the open hole and the equipment adjacent thereto.

Figure 4:
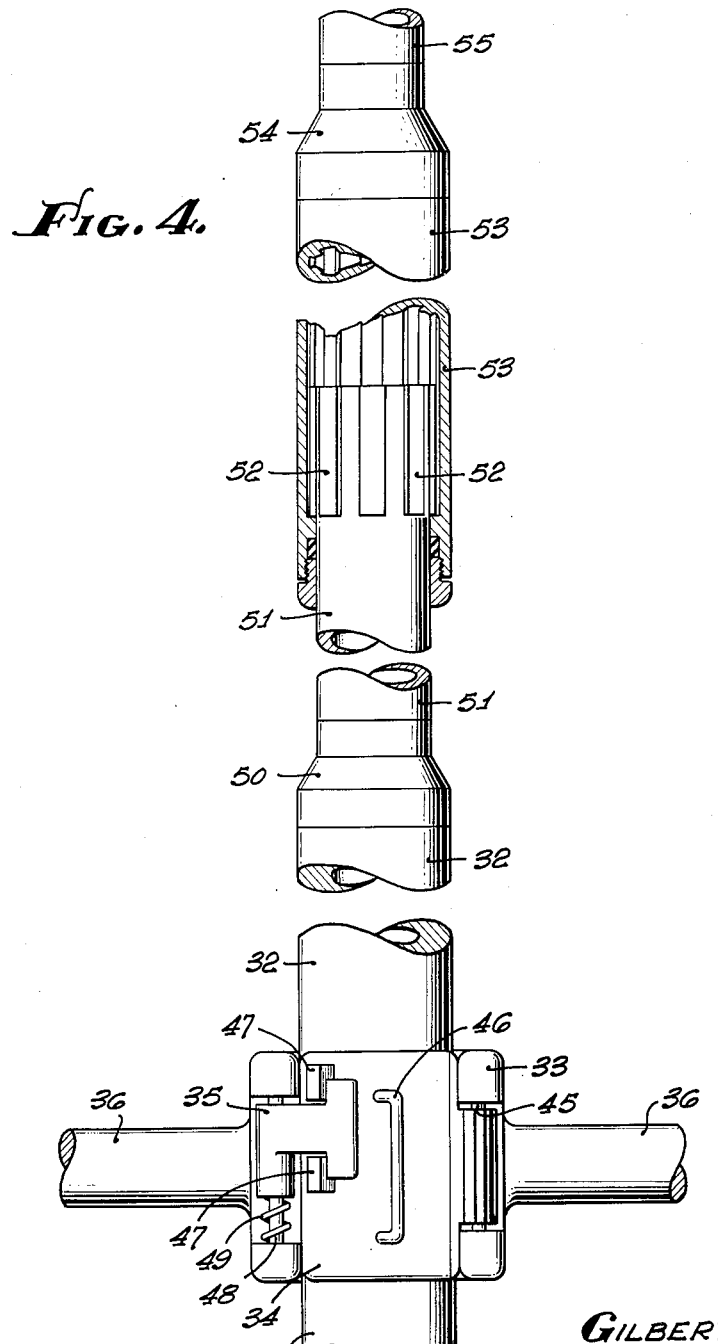
FIG. 4 is a view in larger scale, partially in section, showing parts of the drilling string and of the holder employed therewith.

Referring to the drawing, FIG. 1 shows a ship 10 adapted for drilling operations by being provided with a derrick 11, a well 12, and equipment not illustrated including a rotary table mounted on gimbals, draw works, pipe racks, etc.

A drilling shaft 13, suspended from derrick 11 and passing through well 12, is shown as being lowered toward bore hole 14. The shaft is of the kind heretofore employed in drilling from floating vessels and, in addition to the drill pipe and drill collar universally employed in rotary drilling, the shaft includes one or more splined, telescoping connections such as the one depicted in FIG. 4. A number of bumper subs sufficient to allow for the rising and falling of the ship with the waves and tides is satisfactory for this portion of the shaft.

In accordance with this invention, equipment which is illustrated more fully in FIGS. 2 and 3 is employed to guide the drill bit and the drilling shaft into the bore hole.

A guide weight 15 is shown in perspective view in FIG. 2. FIG. 3 includes a sectional view of the same device in position of use. This guide weight is a separable article which, when assembled, comprises a circular base plate 16 having a central opening, a short cylindrical wall 17 surrounding the opening and extending upwardly from the plate, a flaring wall 18 affixed to the top of the cylindrical wall to form a funnel-shaped structure, vertical brace plates 19—19, arms 20—20 extending in opposite directions from cylindrical wall 17, and, on the lower side of the base plate, a depending square wall 21 more clearly illustrated in FIG. 3.

To insure that the guide weight will lie flat on the bottom of a body of water with its funnel-shaped structure facing upwardly, the diameter of base plate 16 is made substantially greater than the greatest vertical dimension of the device.

The base plate consists of two halves 22 and 23. Along the straight edges of half plate 22 are welded angle irons 24 and triangular braces 25—25, and along the straight edges of half plate 23 are welded arms 20—20, which are made of H-beams with the flanges cut away at the ends and with one flange of each cut away through most of its length to make room for angle irons 24 when the guide weight is assembled.

The funnel-shaped structure composed of cylindrical wall 17 and flaring wall 18 is also divided into two portions, and tabs 25'—25' are welded to one of the parts of the flaring wall in such manner as to extend past the edge and lap over the other part of the flaring wall. Bolts 26—26 and 27—27 hold the two portions of the guide weight together.

Lead bars, one set of which is shown at 28, are bolted to the base plate on opposite sides of the cylindrical wall to augment the weight of the device. A total weight of about 2500 pounds is ordinarily satisfactory. The ends of arms 20—20 are drilled at a level above the center of gravity of the weighted structure to receive shackles 29—29, shown in FIG. 3.

Flaring wall 18 has the form of the frustrum of a decagonal pyramid merely to facilitate construction of the device from heavy steel plate. The square form of depending wall 21 (composed of angle iron) is chosen in part for similar reasons and in part because a better anchoring effect is achieved than if the wall were circular or nearly so.

As a preliminary to the drilling operation, guide weight 15 is lowered to the bottom by cables 30—30 (FIGS. 1 and 3) affixed to shackles 29—29, and the cables, the upper ends of which are held by gear in vessel 10, remain in place to serve as guide lines.

When drilling shaft 13 is assembled initially and each time thereafter, a holder 31 (FIGS. 3 and 4) is closed around drill collar 32. The holder is a modified pipe elevator having the customary body 33, door 34, and latch 35. In place of the usual ears or trunnions it is provided with elongated bars 36 which have shackles 37 affixed at the ends. Bars 36 are also provided with loops 39—39 for attachment to lines 40—40.

In FIG. 3 the central portion of holder 31 is represented as a conventionalized side-door pipe elevator. This structure is portrayed in more detail in FIG. 4. Door 34 is hinged to body 33 by pin 45, and it is provided with handle 46 and lugs 47—47. Latch 35 is hinged to the other side of the elevator body by pin 48 and is fitted with spring 49 which keeps the latch in engagement with lugs 47—47 during operation, thereby preventing accidental opening of the door.

FIG. 4 also shows a splined, telescoping connection incorporated in the drilling shaft. The upper end of drill collar 32 is affixed by crossover sub 50 to mandrel 51, which has external splines 52—52 adjacent to its upper end. The splines fit the internal splines of barrel 53, so that the mandrel and barrel are constrained to move together with respect to rotation but are free to move longitudinally with relation to one another through a limited distance. The upper end of barrel 53 is affixed by crossover sub 54 to drill pipe 55.

The holder being placed around the drill collar and shackles 37 being fastened around lines 30—30, assembly and lowering of the drilling shaft proceed. FIG. 1 shows drill bit 41 approaching guide weight 15 and being steered toward it by lines 30—30 acting through the arms of holder 31. FIG. 3 shows a slightly more advanced stage, in which drill bit 41 has entered the funnel-shaped portion of the guide weight and is about to drop into bore hole 14. When this is accomplished, the remainder of the drilling shaft is made up and lowered until the bit rests upon the bottom of the bore hole. Meanwhile, holder 31 may be hoisted back to the ship by lines 40—40.

It will be understood that the first time the drilling shaft is lowered into the guide weight, bore hole 14 does not yet exist. At this stage of the operations, the guide weight has the additional function of keeping the rotating bit at the drilling site until the hole is started.

FIG. 3 illustrates conditions frequently encountered in marine drilling, in which the bed rock 42, consisting of hard or at least coherent material, is covered by a thin layer of sand and silt 43. The drawing shows this to be in turn covered by a low annular mound 44 consisting of the cuttings carried out of the hole by the water employed as drilling fluid.

When guide weight 15 is put in position, depending wall 21 sinks into soft layer 43 and serves to anchor the guide weight against lateral movement. In some cases, layer 43 is nearly or completely absent, having been swept away or kept from accumulating by strong currents. In such cases the lower edge of depending wall 21 is seated directly upon the rough surface of the rock, and the extremely high friction between the two serves to anchor the weight.

The drilling operation referred to herein is one in which water is employed as the drilling fluid and is not recovered for continued use. When, because of the depth of the hole or the nature of the formations encountered, it becomes necessary to use a more costly drilling fluid which must be preserved, a conductor pipe between the vessel and the mouth of the hole is needed. This pipe is guided into place in the same manner as that described above for guiding the drilling shaft into the hole. The guide weight may be left in place to assist in anchoring the lower end of the conductor pipe or, if the pipe is deeply set and rigidly cemented, the guide weight may be hoisted back to the vessel by lines 30—30, disassembled by removal of bolts 26—26 and 27—27, and removed from around the pipe. Subsequent operations of drilling and well completion are carried on by methods not forming portions of the present invention.

The equipment herein described have been used successfully in water ranging in depth from 50 to 500 feet and, if required, they may be used in water much deeper.

I claim as my invention:

1. Equipment for drilling an open hole at the bottom of a body of water from a floating vessel comprising: An essentially flat guide weight having a transverse opening therethrough and an upwardly flaring funnel-shaped structure surrounding said opening, said guide weight being placed at the bottom of said body of water; a pair of flexible guide lines affixed to said guide weight on opposite sides of said funnel-shaped structure, the upper ends of said lines being held at said floating vessel; a drilling shaft suspended from said floating vessel and provided with a drill bit at its lower end; and a holder comprising a central body embracing said drilling shaft and provided with a side opening of greater breadth than the diameter of said drilling shaft, a door hinged to said body and arranged to block said side opening when in closed position, releasable means for holding said door in closed position, and a pair of oppositely extending arms affixed to said body and slidably attached to said guide lines.

2. A guide weight for facilitating the insertion of tools and instruments into an open bore hole at the bottom of a body of water, comprising: a flat plate having an opening therethrough, the diameters of said flat plate being substantially greater than the greatest dimension of said guide weight measured in a direction perpendicular to said flat plate; an upwardly flaring funnel-shaped structure affixed to said flat plate around said opening; a downwardly projecting wall affixed to the lower surface of said flat plate, the diameters of the enclosure bounded by said wall being substantially greater than the greatest diameter of said opening; a means for affixing cables to said guide weight at points distributed around said funnel-shaped structure.

3. Equipment for drilling an open hole at the bottom of a body of water from a floating vessel comprising: an essentially flat guide weight having a transverse opening therethrough and an upwardly flaring funnel-shaped structure surrounding said opening, said guide weight comprising two separable parts each of which includes a portion of the structure around said opening, and said guide weight being placed at the bottom of said body of water; a plurality of flexible guide lines affixed to said guide weight at points distributed around said funnel-shaped structure, the upper ends of said lines being held at said floating vessel; a drilling shaft suspended from said floating vessel and provided with a drill bit at its lower end; and a holder having a central body adapted to be closed around said drilling shaft and to be reopened for removal therefrom and having a plurality of radiating arms slidably attached to said flexible guide lines.

References Cited in the file of this patent

UNITED STATES PATENTS

| | | |
|---|---|---|
| 525,795 | Palmer | Sept. 11, 1894 |
| 962,019 | Flood et al. | June 21, 1910 |
| 1,175,725 | Dunbar | Mar. 14, 1916 |
| 1,265,494 | Packard | May 7, 1918 |
| 1,598,439 | Hansen | Aug. 31, 1926 |
| 1,691,715 | Hansen | Nov. 13, 1928 |
| 1,967,517 | Rogers | July 24, 1934 |
| 2,171,672 | Plummer | Sept. 5, 1939 |
| 2,606,003 | McNeill | Aug. 5, 1952 |
| 2,676,787 | Johnson | Apr. 27, 1954 |
| 2,808,230 | McNeill et al. | Oct. 1, 1957 |